(12) United States Patent
Niitsu et al.

(10) Patent No.: US 7,146,065 B2
(45) Date of Patent: Dec. 5, 2006

(54) OPTICAL WIRING BOARD, OPTICAL BUS SYSTEM, AND METHOD OF MANUFACTURING OPTICAL WIRING BOARD

(75) Inventors: Takehiro Niitsu, Kanagawa (JP); Masao Funada, Kanagawa (JP); Kenichi Kobayashi, Kanagawa (JP); Hidenori Yamada, Kanagawa (JP); Takeshi Kamimura, Kanagawa (JP); Junji Okada, Kanagawa (JP); Shinya Kyozuka, Kanagawa (JP); Kazuhiro Sakai, Kanagawa (JP); Tomo Baba, Kanagawa (JP); Tsutomu Hamada, Kanagawa (JP); Masashi Hisada, Kanagawa (JP); Shinobu Ozeki, Kanagawa (JP); Osamu Takanashi, Kanagawa (JP); Masaaki Miura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 208 days.

(21) Appl. No.: 10/728,963

(22) Filed: Dec. 8, 2003

(65) Prior Publication Data
US 2005/0123231 A1   Jun. 9, 2005

(51) Int. Cl.
*G02B 6/12* (2006.01)

(52) U.S. Cl. .................................. 385/14; 385/129
(58) Field of Classification Search .................. 385/14
See application file for complete search history.

(56) References Cited

U.S. PATENT DOCUMENTS

| 5,790,731 | A  | * | 8/1998 | Deveau ......................... 385/49 |
| 6,733,190 | B1 | * | 5/2004 | Kuhara et al. ................. 385/94 |
| 2004/0057731 | A1 | * | 3/2004 | Ozeki et al. ................. 398/164 |

FOREIGN PATENT DOCUMENTS

| JP | 10-307229 | * 11/1998 |
| JP | A 11-202149 | 7/1999 |
| JP | A 11-258447 | 9/1999 |
| JP | A 2000-329962 | 11/2000 |
| JP | A 2003-114353 | 4/2003 |

* cited by examiner

*Primary Examiner*—Jennifer Doan
(74) *Attorney, Agent, or Firm*—Oliff & Berridge, PLC

(57) ABSTRACT

In an optical wiring board, an optical components including a planar optical waveguide, a plurality of first optical fibers optically connected via a transmissive diffusion plate to a light incident face of the waveguide, and a plurality of second optical fibers optically connected to a light emitting face of the waveguide is placed on a support board. The optical component is sealed by a sealing member made of a resin.

11 Claims, 9 Drawing Sheets

OPTICAL WIRING BOARD, OPTICAL BUS SYSTEM, AND METHOD OF MANUFACTURING OPTICAL WIRING BOARD

The present disclosure relates to the subject matter contained in Japanese Patent Application No.2001-307500 filed on Oct. 3, 2001, which is incorporated herein by reference in its entirety.

BACKGROUND OF THE INVENTION

1. Field of the Invention

The present invention relates to an optical wiring board and an optical bus system through which transmission between boards or chips is conducted by means of a light signal, and a method of manufacturing such an optical wiring board, and more particularly relates to an optical wiring board and an optical bus system, which can be manufactured easily and have a high degree of freedom in arrangement of optical components, and a method of manufacturing such an optical wiring board.

2. Description of the Related Art

Conventionally, an optical wiring board in which data are optically transmitted has been proposed for a purpose of increasing the data transmission speed between boards or chips and reducing electromagnetic noise.

JP-A-2000-329962 discloses such a conventional optical wiring board.

The optical wiring board includes a planar optical waveguide, a plurality of first optical fibers optically connected to one end face of the waveguide, a plurality of second optical fibers optically connected to the other end face of the waveguide, and a support board in which grooves for accommodating the waveguide and the optical fibers are formed. The waveguide and the optical fibers are accommodated and supported in the grooves. An electro-optical conversion circuit is connected to the first optical fibers via photoelectric conversion elements. An opto-electrical conversion circuit is connected to the second optical fibers via photoelectric conversion elements. According to the configuration, many-to-many communication can be conducted between the electro-optical conversion circuit and the opto-electrical conversion circuit. Since the optical fibers can be embedded in the grooves, the optical fibers can be disposed while being bent. Moreover, devices for fixing the optical fibers are not required, and hence an apparatus can be more miniaturized than a case where the optical fibers are disposed on a surface of the support board.

In the optical wiring board disclosed in JP-A-2000-329962, the optical waveguide and the optical fibers are accommodated and positioned in the grooves formed by a cutting process, thereby causing problems in that the cost of the cutting process is increased, and that the degree of freedom in arrangement is lowered.

SUMMARY OF THE INVENTION

It is an object of the invention to provide an optical wiring board and an optical bus system which can be easily manufactured and have a high degree of freedom in the arrangement of optical components, and a method of manufacturing such an optical wiring board.

In order to attain the objects, according to the embodiment of the invention, an optical wiring board includes a support board and an optical component. The optical component includes an optical waveguide, which has a plate shape and has at least two end faces; and an optical fiber connected to at least one of the end faces of the optical waveguide optically. The optical component is placed on the support board. The optical component is sealed by resin.

In order to attain the objects, according to the embodiment of the invention, an optical bus system includes a conversion circuit section for converting an electric signal into an optical signal and converting the optical signal into the electric signal, and an optical wiring board for transmitting and receiving the optical signal to and from the conversion circuit section. The optical wiring board includes a support board and an optical component. The optical component includes an optical waveguide, which has a plate shape and has at least two end faces, and an optical fiber connected to at least one of the end faces of the optical waveguide optically. The optical component is placed on the support board. The optical component is sealed by resin.

In order to attain the objects, according to the embodiment of the invention, A method for manufacturing an optical wiring board including a support board and an optical component having an optical waveguide, which has a plate shape and has at least two end faces, and an optical fiber connected to at least one of the end faces of the optical waveguide optically, wherein the optical component is placed on the support board, the method includes temporarily securing the optical component on the support board, and sealing the optical component by resin.

DETAILED DESCRIPTION OF THE PREFERRED EMBODIMENTS

Figure 1A:
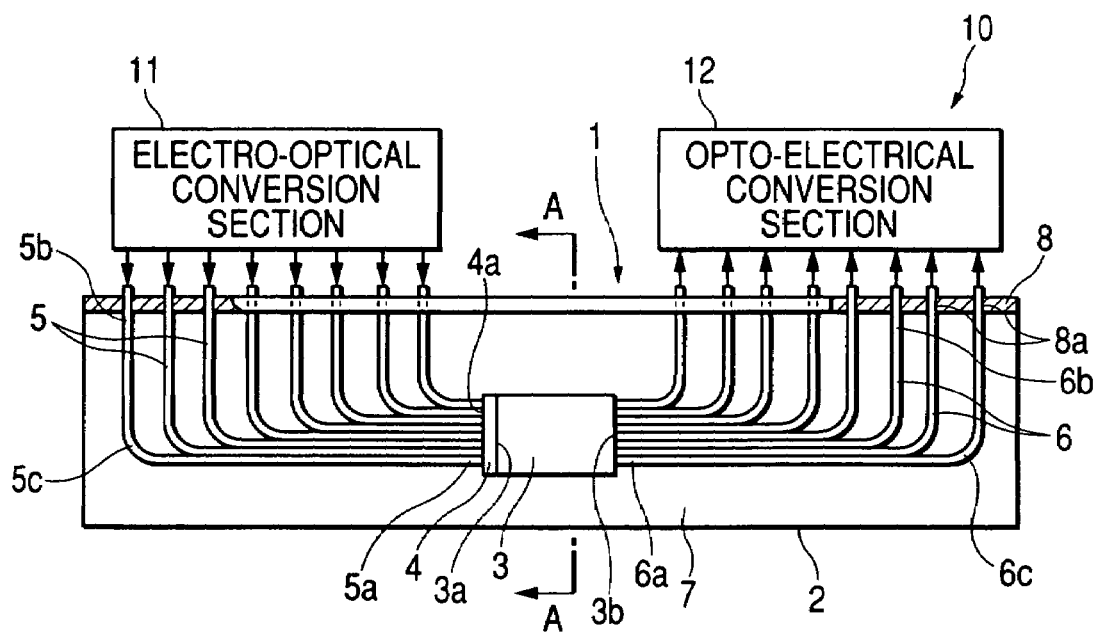
FIG. 1A is a plan view showing an optical bus system to which an optical wiring board of a first embodiment of the invention is applied.
Figure 1B:
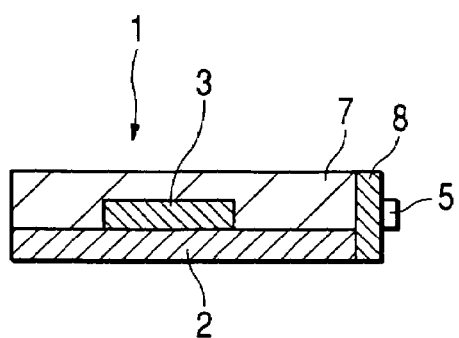
FIG. 1B is a section view taken along the line A—A in FIG. 1A.
Figure 2:
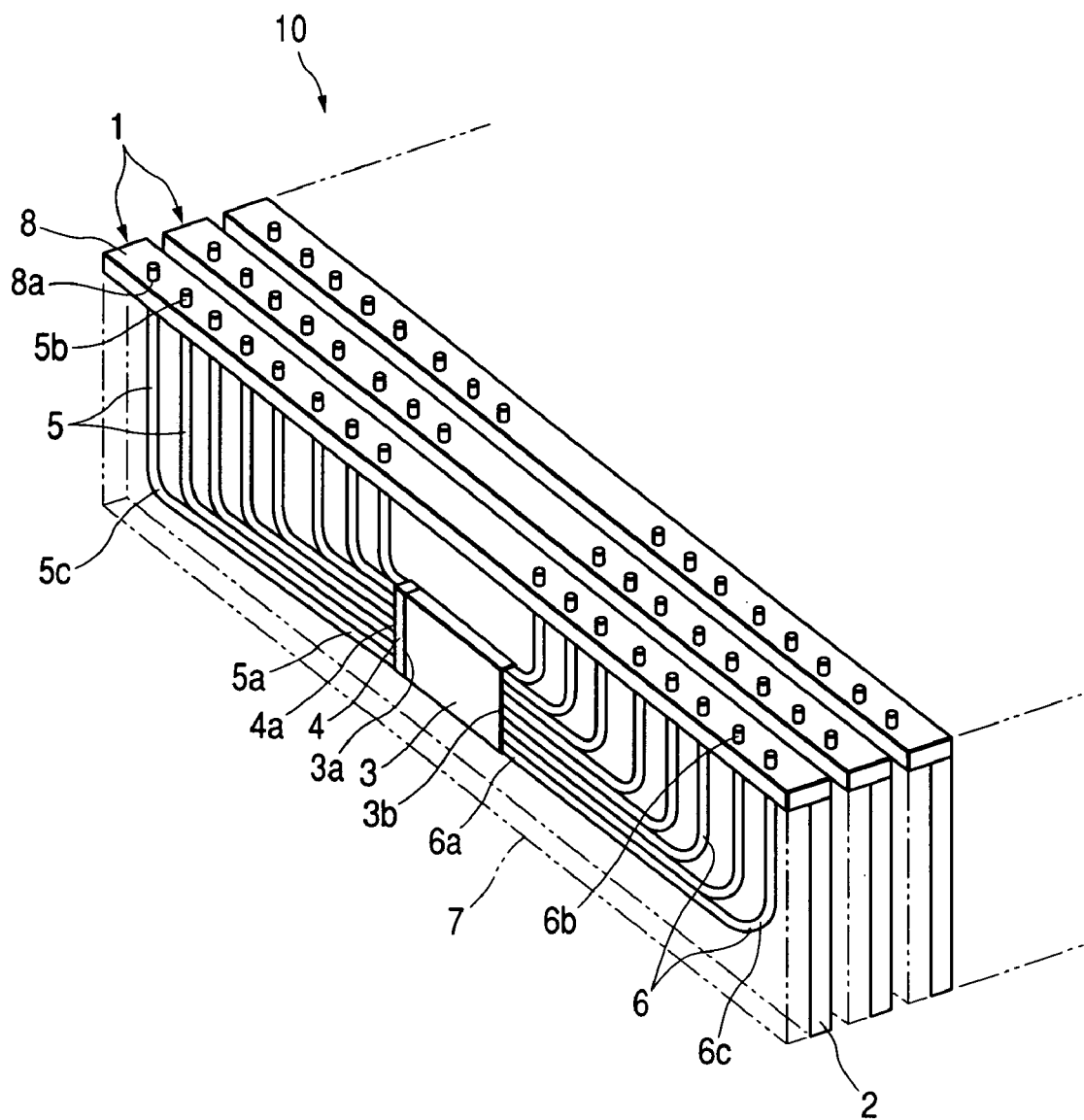
FIG. 2 is a perspective view of main portions showing the optical bus system to which the optical wiring board of the first embodiment of the invention is applied.

FIGS. 1 and 2 show an optical bus system of a first embodiment to which an optical wiring board of the invention is applied. FIG. 1A is a plan view, FIG. 1B is a section view taken along the line A—A in FIG. 1A, and FIG. 2 is a perspective view. As shown in FIGS. 1 and 2, the optical bus system 10 includes a plurality of optical wiring boards 1 arranged with forming given gaps therebetween; a plurality of electro-optical conversion circuits 11 which, as shown in FIG. 1A, convert an electric signal into a light signal and supply the light signal to the respective optical wiring boards 1; and a plurality of opto-electrical conversion circuits 12 which convert a light signal output from the respective optical wiring boards 1 into an electric signal.

Each of the electro-optical conversion circuits 11 and the opto-electrical conversion circuits 12 has a CPU, a memory, and a photoelectric conversion element and is connected to the corresponding optical wiring board 1 via the photoelectric conversion element.

The optical wiring board 1 includes a support board 2; a planar optical waveguide 3 placed on the support board 2; a plurality of (for example, eight) first optical fibers 5 in which tip ends 5a are optically connected via a transmissive diffusion plate 4 to a light incident face 3a that is one end face of the waveguide 3; a plurality (for example, eight) of second optical fibers 6 in which tip ends 6a are optically connected to a light emitting face 3b that is the other end face of the waveguide 3; and a positioning member 8 in which rear ends 5b and 6b of the optical fibers 5 and 6 are passed through positioning holes 8a to position the rear ends 5b and 6b. The optical components including the waveguide 3, the transmissive diffusion plate 4, and the optical fibers 5 and 6 are sealed by a sealing member 7 made of a resin. In FIGS. 1A and 2, the sealing member 7 is shown as a transparent member.

The support board 2 is made of a metal such as aluminum, a resin such as polymethyl methacrylate (PMMA), glass, or ceramics. The material of the support board 2 is not particularly limited to these examples so long as the positioning and fixation of the optical components are not adversely affected. Alternatively, a flexible board made of polyimide may be used.

The waveguide 3 includes a planar core and a clad. The planar core has a plate-like shape and has, for example, a thickness of 0.5 mm, a width of 4 mm, and a length of 20 mm. The planar core is made of a transparent material. The clad is formed on the upper, lower, and right and left side faces of the core except the light incident face 3a and the light emitting face 3b. The clad is lower in refractive index than the core. The core is made of, for example, a plastic material such as polymethyl methacrylate (PMMA), polycarbonate, or amorphous polyolefin, or inorganic glass. The clad is made of a fluoroplymer. In the case where the sealing member 7 functions also as a clad, the clad may be omitted.

The transmissive diffusion plate 4 may be formed in a such a manner that an epoxy layer is formed on a substrate of a resin such as an acrylic resin, polycarbonate, or polyester and then cured by ultraviolet rays, and a concave and convex pattern for diffusing light is formed on a light incident face (diffusing portion) 4a. Alternatively, the transmissive diffusion plate 4 may be formed in such another manner that a concave and convex pattern is formed directly on the light incident face (diffusing portion) 4a by injection molding. The diffusion plate may be of a type in which particles of different refractive indices are dispersed in an inner portion thereof so that the inner portion functions as a diffuser.

Each of the first and second optical fibers 5 and 6 includes a core having an outer diameter of, for example, 0.5 mm, and having a circular section shape, and a clad disposed around the core. The rear ends 5b and 6b are bent at curved portions 5c and 6c so as to be perpendicular to the long edge of the support board 2 and slightly exposed from the long edge of the support board 2. In the case where the sealing member 7 also functions as a clad, the clads of the optical fibers 5 and 6 may be omitted.

A resin such as a silicone resin or an epoxy resin may be used as the sealing member 7. Such a resin can be cured by cold curing, heat curing, UV curing, or another curing process. The method of applying the resin to the sealing member 7 is not limited to a particular method, and may be any one of methods including pouring, application by a roller, and application by a blade which will be described later, and a screen printing method, and a spin coating method so long as the resin can be applied in a desired thickness. Alternatively, a member such as a heat-fusible resin film described later, which is melted by heating and is returned to its original state at ordinary temperature, may be used as the sealing member 7.

Figure 3A:
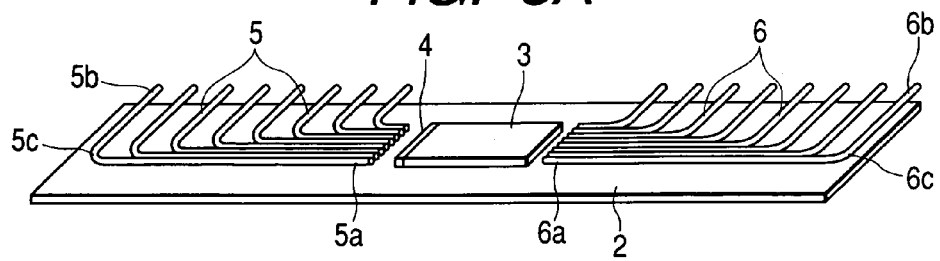
FIGS. 3A to 3D are perspective views showing steps of producing the optical wiring board of the first embodiment.
Figure 3B:
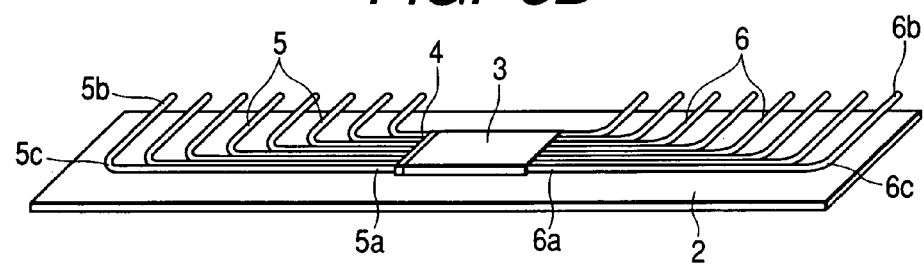
Figure 3C:
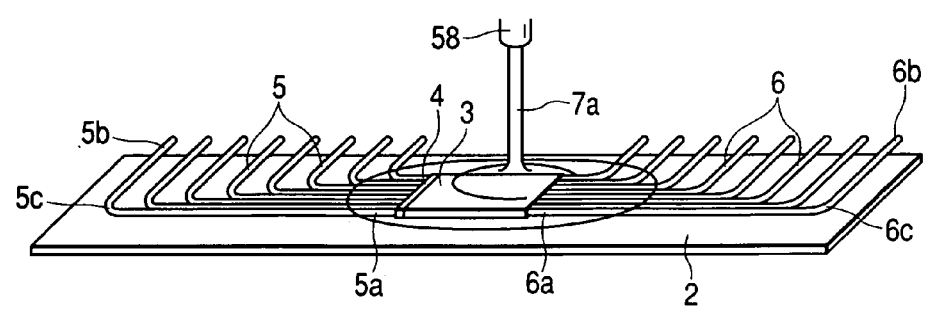
Figure 3D:
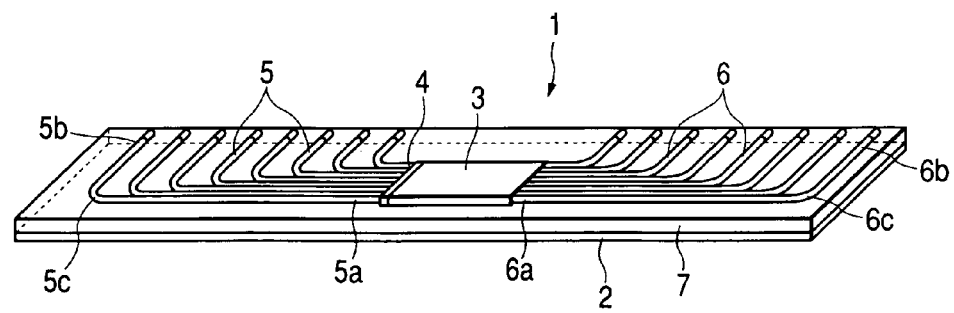

FIGS. 3A to 3D show steps of manufacturing the optical wiring board 1 of the first embodiment. As shown in FIG. 3A, the optical components including the waveguide 3, the transmissive diffusion plate 4, and the first and second optical fibers 5 and 6 are placed on the support board 2. As shown in FIG. 3B, the optical components are temporarily secured by a temporarily securing member, which will be described later. Then, as shown in FIG. 3C, a resin 7a in a fluid state is poured from a syringe 58 onto the support board 2, and cured to form the sealing member 7 as shown in FIG. 3D. The optical wiring board 1 is manufactured in this way. In the case of pouring the resin 7a, a frame surrounding the support board 2 may be preferably disposed so as to prevent the resin 7a from flowing down from the support board 2. If the resin 7a is highly viscous, the surrounding frame may not be disposed.

FIGS. 4A to 4D show methods of temporarily securing the optical components. In the specification, the term "temporary securing" means positioning or fixation of the optical components, and the term "fixation" means both fixation in which the optical components are fixed so as to be immovable, and that in which the optical components are fixed so as to be slightly movable.

Figure 4A:
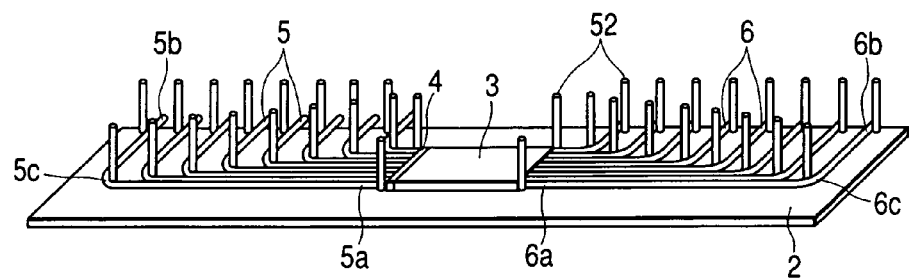
FIGS. 4A to 4D are perspective views showing methods of temporarily securing the optical components.

The optical components may be positioned in one of the following manners. As shown in FIG. 4A, positioning pins 52 may be disposed so that a part of the positioning pins 52 upstand and butt against corners of the waveguide 3 and the transmissive diffusion plate 4, and other positioning pins 52 upstand inside the curved portions 5c and 6c of the optical fibers 5 and 6 and outside the rear ends 5b and 6b.

Figure 4B:
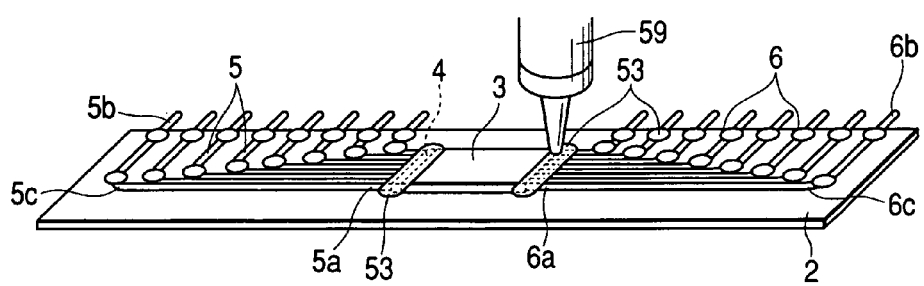

As shown in FIG. 4B, the waveguide 3 and the transmissive diffusion plate 4 are fixed by a positioning adhesive agent 53 such as a silicone resin ejected from a tube 59, so that the curved portions 5c and 6c and the rear ends 5b and 6b of the optical fibers 5 and 6 are fixed. In this case, an adhesive agent having a refractive index equivalent to those of the optical fiber 6 and the waveguide 3 may be used as the positioning adhesive agent 53 to fill the gap between the end face of the tip end 6a of the optical fiber 6 and the end face of the waveguide 3. In the case where the transmissive diffusion plate 4 is of the type in which particles of different refractive indices are dispersed in the inner portion thereof, an adhesive agent having a refractive index equivalent to those of the optical fibers 5 and 6 and the waveguide 3 may be used as the positioning adhesive agent 53, and the gaps between the end face of the tip end 5a of the optical fiber 5 and the transmissive diffusion plate 4, and between the end face of the tip end 6a of the optical fiber 6 and the end face of the waveguide 3 may be filled with the positioning adhesive agent 53.

Figure 4C:
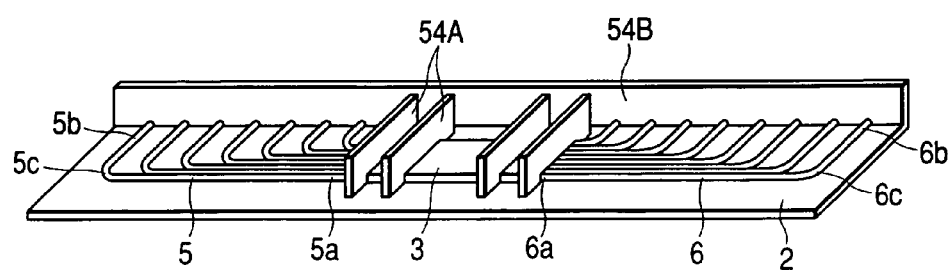

As shown in FIG. 4C, the waveguide 3 and the transmissive diffusion plate 4 are fixed by positioning jigs 54A, and the rear ends 5b and 6b of the optical fibers 5 and 6 are fixed by a positioning jig 54B. The shapes and numbers of the positioning jigs 54A and 54B are not particularly limited so long as the same effects can be attained.

Figure 4D:
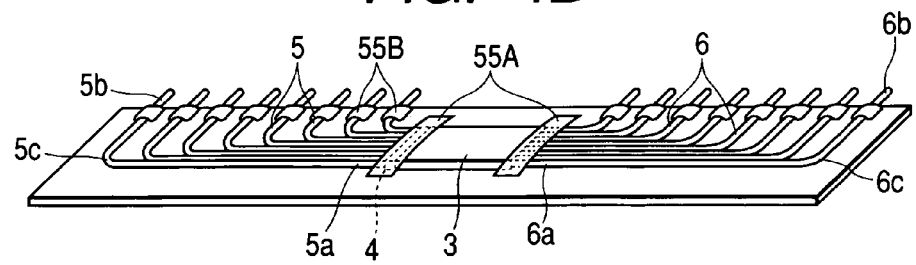

As shown in FIG. 4D, the waveguide 3 and the transmissive diffusion plate 4 are fixed by a fixing tape 55A, and the rear ends 5b and 6b of the optical fibers 5 and 6 are fixed by a fixing tape 55B.

The optical components, which are in the fixed state shown in FIGS. 4A to 4D, may be sealed by the sealing member 7, and the positioning pins 52 or the positioning jigs 54A and 54B may be then removed away.

Next, an operation example of the optical bus system 10 will be described. When the CPU in one of the electro-optical conversion circuits 11 outputs an electric signal such as a clock signal, the clock signal is converted into a light signal by one of the photoelectric conversion elements of the electro-optical conversion circuits 11, and the light signal is input into corresponding one of the first optical fibers 5 in the optical wiring board 1. The light signal input to the first optical fiber 5 is diffused by the transmissive diffusion plate 4, passed through the waveguide 3 to be output from the second optical fibers 6, and then input to the opto-electrical conversion circuit 12. The light signal input to the opto-electrical conversion circuit 12 is converted into an electric signal by the photoelectric conversion element of the opto-electrical conversion circuit 12, and the electric signal is transmitted to the memory of the opto-electrical conversion circuit 12.

In the thus configured first embodiment, since the support board 2 has no grooves for positioning the optical components, the support board can be manufactured easily. The optical components can be changed in configuration freely. The degree of freedom in the arrangement of the optical components can be enhanced. Since the plural first optical fibers 5 are optically connected to the plural second optical fibers 6 via the waveguide 3, many-to-many communication is enabled.

In the case where the difference in thermal expansion coefficient between the support board 2 and the other optical components is relatively large, a resin cured at ordinary temperature or at a relatively low temperature (for example, 40.C. or lower) is preferably used as the resin for the sealing member 7. An example of such a resin is a two-component silicone resin, which is cured at ordinary temperature. When such a resin is used, warp of the support board 2 and positional deviations of the optical components due to the difference in thermal expansion coefficient can be prevented from occurring.

In the case where the difference in thermal expansion coefficient between the support board 2 and the other optical components is relatively small, not only a resin which is cured at ordinary temperature or at a relatively low temperature, but also a resin which is cured at a relatively high temperature (for example, 80 to 120.C. for 30 to 60 minutes) may be used as the resin for the sealing member 7. When the support board 2, the waveguide 3, and the transmissive diffusion plate 4 are made of an acrylic resin, for example, a configuration in which the difference in thermal expansion coefficient between the support board 2 and the other optical components is relatively small can be attained. In this example, a silicone resin which is cured at 100.C. for 30 minutes may be used as the resin for the sealing member 7. When such a resin is used, the resin curing time can be shortened, and the productivity can be enhanced.

Figure 5A:
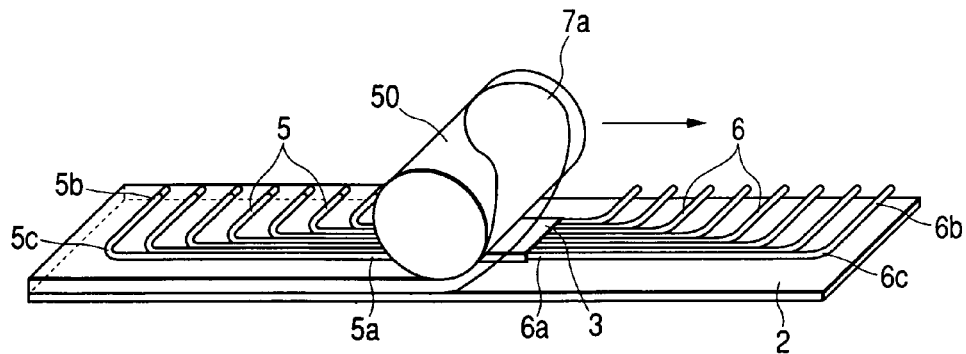
FIGS. 5A to 5C are perspective views showing other sealing methods by a resin.
Figure 5B:
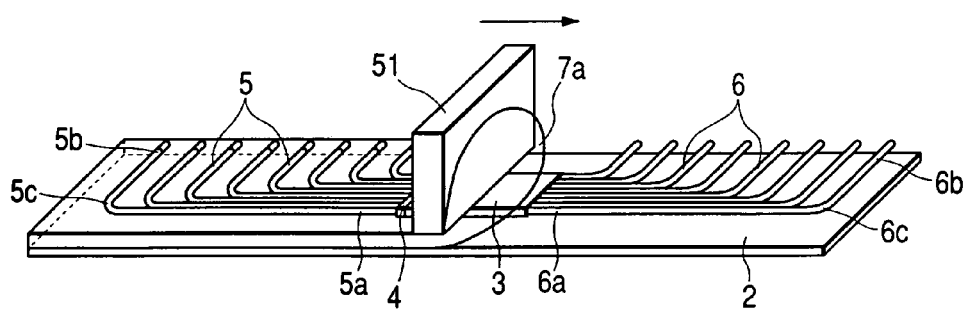
Figure 5C:
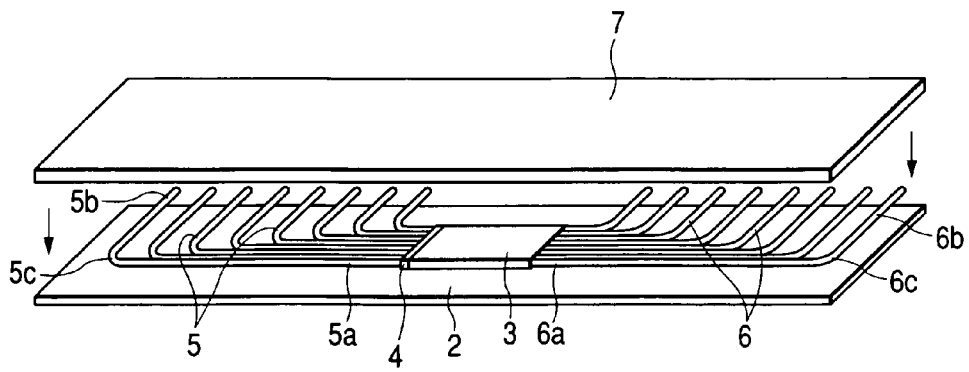

FIGS. 5A to 5C show other sealing methods by a resin. As shown in FIG. 5A, the resin 7a may be applied onto the support board 2 while rotating a roller 50. As shown in FIG. 5B, the resin 7a may be applied onto the support board 2 while sliding a blade 51. As shown in FIG. 5C, the sealing member 7 may be formed with using a heat-fusible resin film. The heat-fusible resin film may be hydrocarbon plastic such as polyethylene and polystyrene; polar vinyl plastic such as polyvinyl chloride and polymethyl methacrylate; linear plastic such as polycarbonate and polyimide; cellulosic plastic such as cellulose acetate and celluloid; and thermo plastic resin such as styrene-butadiene or polyolefin thermoplastic elastomer.

Figure 6A:
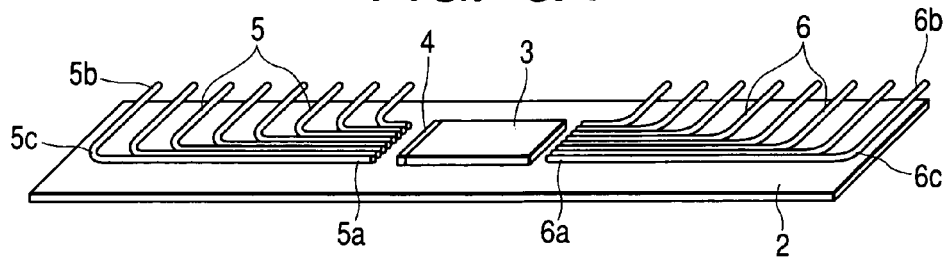
FIGS. 6A to 6D are perspective views showing steps of producing an optical wiring board of a second embodiment of the invention.
Figure 6B:
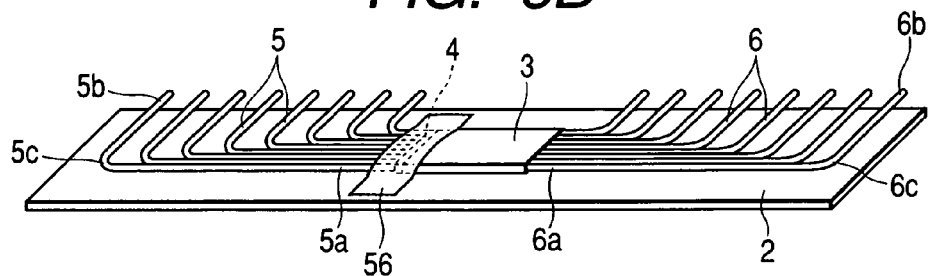
Figure 6C:
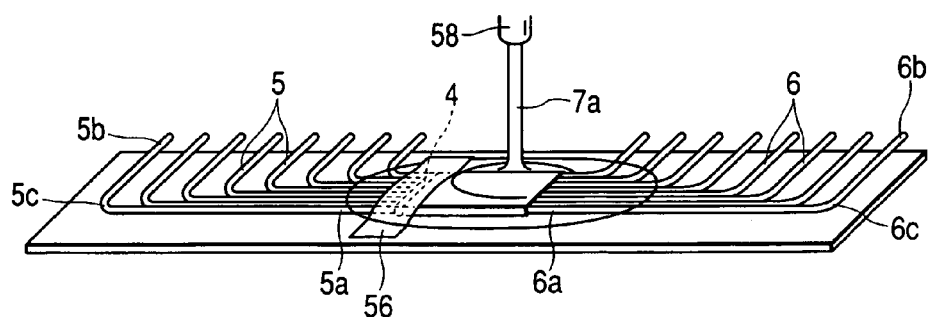
Figure 6D:
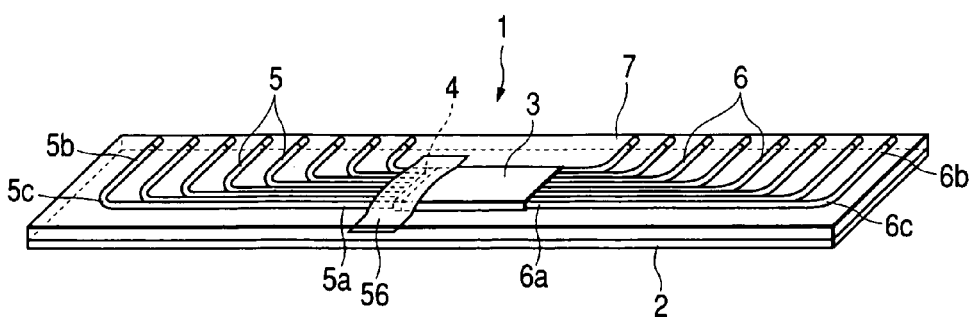

FIGS. 6A to 6D show steps of manufacturing an optical wiring board of a second embodiment of the invention. As shown in FIG. 6A, the optical components including the waveguide 3, the transmissive diffusion plate 4, and the first and second optical fibers 5 and 6 are placed on the support board 2. As shown in FIG. 6B, a protective seal 56 is applied so that the resin 7a does not flow between the light incident face 4a of the transmissive diffusion plate 4 and the first optical fibers 5, and the optical components are temporarily secured by the temporarily securing member as described above. Then, as shown in FIG. 6C, the resin 7a is poured onto the support board 2, and cured to form the sealing member 7. In this way, the optical wiring board 1 shown in FIG. 6D is manufactured. According to the second embodiment, since the resin 7a does not flow between the light incident face 4a of the transmissive diffusion plate 4 and the first optical fibers 5, the light scattering property is stabilized. As a result, uniform light signals can be transmitted to the second optical fibers 6.

Figure 7A:
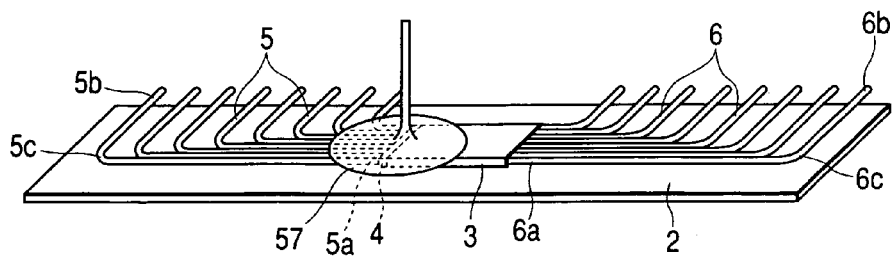
FIGS. 7A to 7D are perspective views showing steps of producing an optical wiring board of a third embodiment of the invention.
Figure 7B:
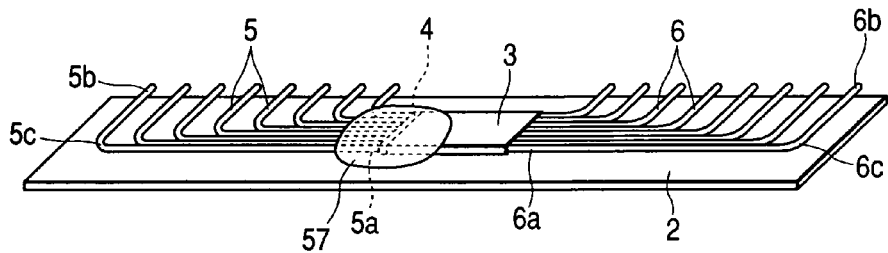

FIGS. 7A to 7D show steps of manufacturing an optical wiring board of a third embodiment of the invention. As shown in FIG. 7A, the optical components including the waveguide 3, the transmissive diffusion plate 4, and the first and second optical fibers 5 and 6 are temporarily secured onto the support board 2 by the temporarily securing member as described above. A high viscosity resin 57 is applied so that the resin 7a does not flow between the light incident face 4a of the transmissive diffusion plate 4 and the first optical fibers 5, and then the high viscosity resin 57 is cured as shown in FIG. 7B. The resin 57 has a desired viscosity so long as the resin 57 keeps an applied shape thereof for several tens minutes after applying the resin 57. Preferably, the resin 57 has 5,000 cps or higher in viscosity. More preferably, the resin 57 further has thixotropic characteristic. If the resin 57 has high viscosity and thixotropic characteristic as described above, shape stability thereof after applying the resin 57 is further improved. As a result, the workability is also improved.

Figure 7C:
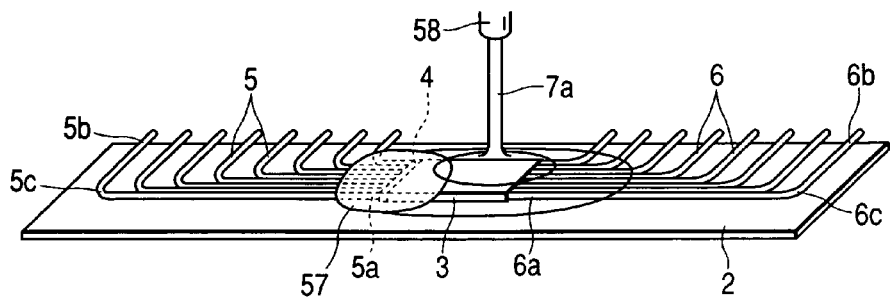
Figure 7D:
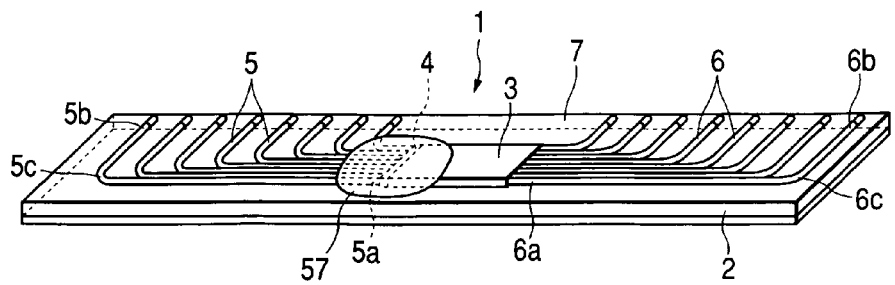

Then, as shown in FIG. 7C, the resin 7a is poured onto the support board 2, and cured to form the sealing member 7. In this way, the optical wiring board 1 shown in FIG. 7D is produced. According to the third embodiment, as with the second embodiment, the light scattering property is stabilized, and uniform light signals can be transmitted to the second optical fibers 6. Alternatively, a low viscosity resin may be applied and cured as an inflow preventing member for the resin 7a.

Incidentally, a resin (such as the resin 57) used for preventing the resin 7a from flowing into may be a low viscosity resin having 5,000 cps or lower. Even in a case of using such a low viscosity resin, no problem occurs so long as the low viscosity resin has a short cure time after applying or the low viscosity resin can be cured by exposing UV radiation while applying so that the low viscosity resin can prevent the resin 7a from flowing into the diffusion member.

Figure 8:
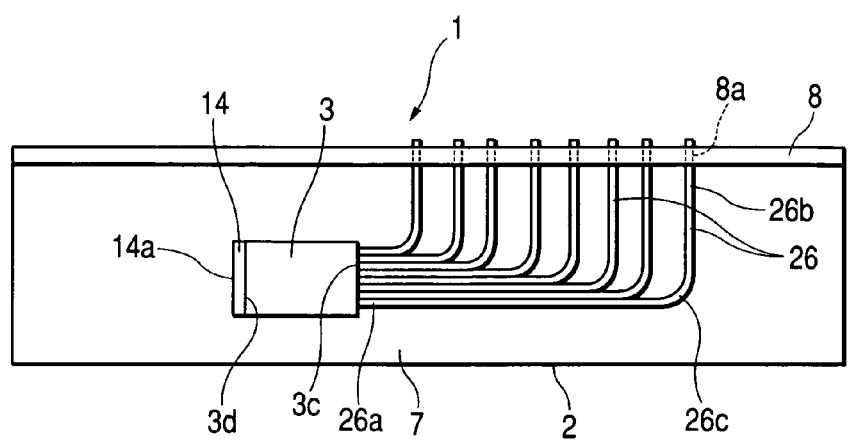
FIG. 8 is a plan view showing an optical wiring board of a fourth embodiment of the invention.
Figure 9:
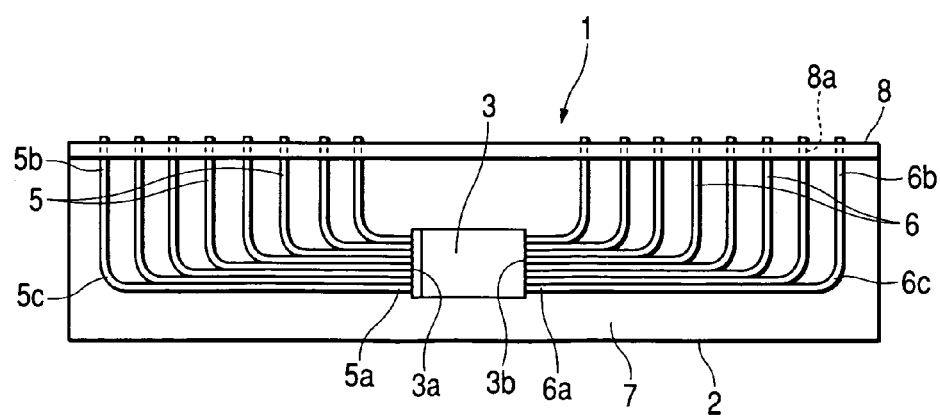
FIG. 9 is a plan view showing an optical wiring board of a fifth embodiment of the invention.
Figure 10:
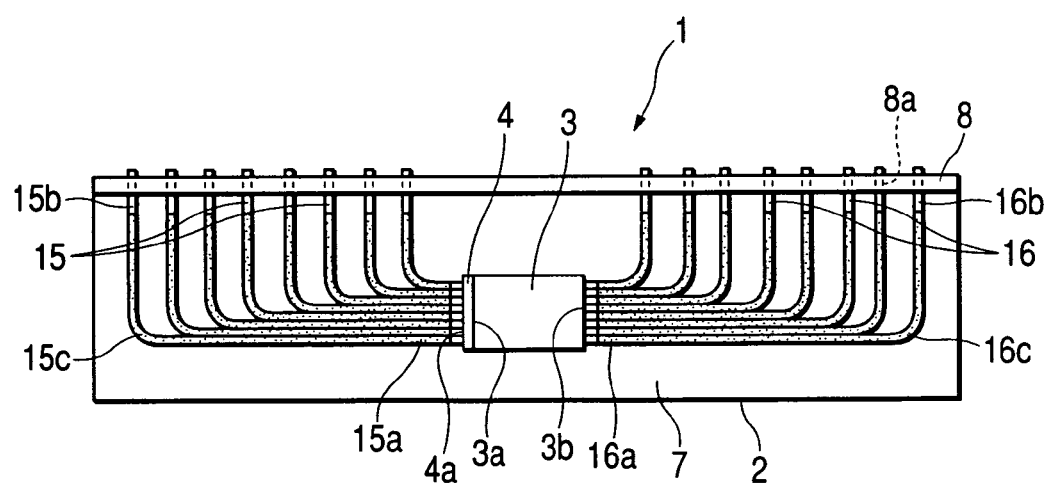
FIG. 10 is a plan view showing an optical wiring board of a sixth embodiment of the invention.

FIG. 8 shows an optical wiring board of a fourth embodiment of the invention. The optical wiring board 1 includes a support board 2; a planar optical waveguide 3 placed on the support board 2; a plurality of (for example, eight) optical fibers 26 optically connected to one end face 3c of the waveguide 3; a reflective diffusion plate 14 placed on the other end face 3d of the waveguide 3; and a positioning member 8 in which rear ends 26b of the optical fibers 26 are passed through positioning holes 8a to position the rear ends 26b. The optical components including the waveguide 3, the reflective diffusion plate 14, and the optical fibers 26 are sealed by the sealing member 7 made of a resin. Alternatively, the reflective diffusion plate 14 may not be used, and only reflected light may be used. In FIGS. 8, and 9 and 10 which will be described later, the sealing member 7 is shown as a transparent member.

In the fourth embodiment, an electro-optical circuit section which can convert an electric signal into a light signal and a light signal into an electric signal is optically connected to the optical fibers 26. When a light signal output from the electro-optical circuit section enters one of the optical fibers 26, the light signal is passed through the waveguide 3 and diffused and reflected by a diffusion face 14a of the reflective diffusion plate 14. The reflected light signal is again passed through the waveguide 3 and enters the optical fibers 26 to be transmitted to the electro-optical circuit section.

FIG. 9 shows an optical wiring board of a fifth embodiment of the invention. The optical wiring board 1 is configured so that, in the first embodiment, the transmissive diffusion plate 4 is not used, and a concave and convex pattern (diffusion face) for diffusing light is formed in the light incident face 3a of the waveguide 3. In the case where the light diffusion is not requested to be provided with high uniformity, the diffusion face may not be disposed.

FIG. 10 shows an optical wiring board of a sixth embodiment of the invention. The optical wiring board 1 is configured so that, as the optical fibers in the first embodiment, optical fibers 15 and 16 having a covering material such as vinyl are used. The optical fibers 15 and 16 are protected by the covering material. Even when the resin 7a for the sealing member 7 is applied by the roller 50 or the blade 51 shown in FIG. 5A or 5B, therefore, the clads and cores of the optical fibers 15 and 16 can be prevented from being damaged.

The invention can be applied also to an optical wiring board in which one optical fiber is connected to one end face of an optical waveguide, and a plurality of optical fibers are connected to the other end face of the waveguide. According to the configuration, one-to-many communication can be conducted.

The invention can be applied also to an optical wiring board in which optical fibers are connected to the end faces of an optical waveguide, and which transmits and receives a light signals so as to conduct bidirectional communication between CPUs. In this case, an electro-optical circuit section which can convert an electric signal to a light signal and a light signal to an electric signal is optically connected to the optical fibers.

As described above, according to the embodiments of the invention, grooves for positioning optical components are not required in an optical wiring board. Therefore, the optical wiring board can be manufactured easily, and the degree of freedom in the arrangement of the optical components is enhanced.

What is claimed is:

1. An optical wiring board comprising:
a support board; and
an optical component including:
an optical waveguide, which has a plate shape and has at least two end faces;
an optical fiber connected to at least one of the end faces of the optical waveguide optically; and
a light diffusion member having a diffusion portion for diffusing light, wherein:
the optical component is placed on the support board;
a top surface of the optical waveguide and the optical fiber is sealed by resin;
the light diffusion member is disposed at one of:
a position between the one of the end faces of the optical waveguide and the optical fiber; and
a position of the other of the end faces of the optical waveguide; and
the optical component further includes an inflow prevention member for preventing the resin from flowing into the diffusion portion of the light diffusion member.

2. The optical wiring board according to claim 1, wherein:
the optical fiber includes a first optical fiber and a second optical fiber;
the first optical fiber is connected to the one of the end faces of the optical waveguide; and
the second optical fiber is connected to the other of the end faces of the optical waveguide.

3. The optical wiring board according to claim 1, wherein:
the optical fiber is a plurality of optical fibers, which are connected to the one of the end faces of the optical waveguide optically; and
an optical signal is input to and output from the optical waveguide through the optical fibers.

4. The optical wiring board according to claim 1, wherein the inflow prevention member is a resin having viscosity being not less than 5000 cps and thixotropic characteristic applied onto a vicinity of an edge of the diffusion portion of the light diffusion member.

5. The optical wiring board according to claim 1, wherein the inflow prevention member is a tape applied to a vicinity of an edge of the diffusion portion of the light diffusion member.

6. The optical wiring board according to claim 1, wherein the resin is selected in accordance with difference in thermal expansion coefficient between the support board and the optical component.

7. The optical wiring board according to claim 1, wherein a refractive index of the resin is smaller than at least one of that of the optical waveguide and that of a core material of the optical fiber.

8. The optical wiring board according to claim 1, wherein the support board has flexibility.

9. An optical wiring board comprising:
a support board;
an optical component including:
an optical waveguide, which has a plate shape and has at least two end faces;
an optical fiber, one end face of which is connected to at least one of the end faces of the optical waveguide optically; and
a light diffusion member having a diffusion portion for diffusing light; and
a positioning member for positioning the other end face of the optical fiber, the positioning member having a through hole which the other end face of the optical fiber passes through, wherein:

the optical component is placed on the support board; and
the optical component is sealed by resin;
the light diffusion member is disposed at one of:
  a position between the one of the end faces of the optical waveguide and the optical fiber; and
  a position of the other of the end faces of the optical waveguide; and
the optical component further includes an inflow prevention member for preventing the resin from flowing into the diffusion portion of the light diffusion member.

10. An optical bus system comprising:
a conversion circuit section for converting an electric signal into an optical signal and converting the optical signal into the electric signal; and
an optical wiring board for transmitting and receiving the optical signal to and from the conversion circuit section, wherein:
the optical wiring board includes:
  a support board; and
  an optical component including:
    an optical waveguide, which has a plate shape and has at least two end faces; and
    an optical fiber connected to at least one of the end faces of the optical waveguide optically; and
    a light diffusion member having a diffusion portion for diffusing light, wherein:
the optical component is placed on the support board; and
the optical component is sealed by resin;
the light diffusion member is disposed at one of:
  a position between the one of the end faces of the optical waveguide and the optical fiber; and
  a position of the other of the end faces of the optical waveguide; and
the optical component further includes an inflow prevention member for preventing the resin from flowing into the diffusion portion of the light diffusion member.

11. A method for manufacturing an optical wiring board including:
  a support board; and
  an optical component having:
    an optical waveguide, which has a plate shape and has at least two end faces; and
    an optical fiber connected to at least one of the end faces of the optical waveguide optically, and
    a light diffusion member having a diffusion portion for diffusing light, wherein
the optical component is placed on the support board;
the light diffusion member is disposed at one of:
  a position between the one of the end faces of the optical waveguide and the optical fiber; and
  a position of the other of the end faces of the optical waveguide;
particles having different refractive index from each other are dispersed in the light diffusion member;
the method comprising:
  temporarily securing the optical component on the support board using one of adhesive and a tape;
  simultaneously sealing the optical waveguide and the optical fiber to the support board by resin over the one of the adhesive and the tape; wherein
  the temporarily securing is conducted using adhesive having a refractive index equal to those of the optical fiber and the optical waveguide; and the temporarily securing includes filling a gap between an end face of the optical fiber and an end face of the optical waveguide with the adhesive.

* * * * *